US007134114B2

(12) United States Patent
Sato et al.

(10) Patent No.: US 7,134,114 B2
(45) Date of Patent: Nov. 7, 2006

(54) APPARATUS, METHOD, AND PROGRAM PRODUCT FOR SUPPORTING PROGRAMMING

(75) Inventors: Yuko Sato, Shizuoka-ken (JP); Tomotaka Murakami, Mishima (JP); Akio Hiruma, Mishima (JP)

(73) Assignee: Toshiba Tec Kabushiki Kaisha (JP)

( * ) Notice: Subject to any disclaimer, the term of this patent is extended or adjusted under 35 U.S.C. 154(b) by 579 days.

(21) Appl. No.: 10/438,281

(22) Filed: May 14, 2003

(65) Prior Publication Data

US 2004/0003372 A1 Jan. 1, 2004

(30) Foreign Application Priority Data

May 17, 2002 (JP) ............................. 2002-142472

(51) Int. Cl.
*G06F 9/44* (2006.01)
(52) U.S. Cl. ...................... 717/106; 717/119; 717/120; 717/122
(58) Field of Classification Search ................ 717/114; 719/328
See application file for complete search history.

(56) References Cited

U.S. PATENT DOCUMENTS

| 6,675,371 B1* | 1/2004 | York et al. ................... 717/114 |
| 6,691,301 B1* | 2/2004 | Bowen ........................ 717/114 |
| 2004/0068735 A1* | 4/2004 | York et al. ................... 719/328 |

FOREIGN PATENT DOCUMENTS

| JP | 04-273524 | 9/1992 |
| JP | 6-68082 | 3/1994 |
| JP | 09-185499 | 7/1997 |

OTHER PUBLICATIONS

Appleman, "Daniel Appleman's Tips Showcase (10th)", Appleman & Daniel, Visual Basic magazine, SHOEISHA, Apr. 1, 1998, vol. 4, No. 4, pp. 162-166.
McKinney, "Visual Basic 5", Super Technique, ASCII Corporation, Mar. 1, 1998, 1st Edition, p. 618.
Communication from Japanese Patent Office (with translation) re: related application.
Communication (with translation) from Japanese Patent Office re: related application.

* cited by examiner

*Primary Examiner*—Kakali Chaki
*Assistant Examiner*—Mark P. Francis
(74) *Attorney, Agent, or Firm*—Harness, Dickey & Pierce, P.L.C.

(57) ABSTRACT

According to an embodiment, a computer system displays, on a display, a GUI dialog box that prompts an operator to set the identification name and thread type of a source file that describes source code of a thread. When the identification name and thread type of the source file are set via the GUI dialog box, the computer system acquires a source code template corresponding to that thread type, and reflects the identification name set via the GUI dialog box in that source code template. The computer system generates a source file with the identification name set via the GUI dialog box in the basis of the source code template. The computer system stores the identification name and thread type set via the GUI dialog box in a definition file as thread definition information of the source file set with the identification name.

12 Claims, 13 Drawing Sheets

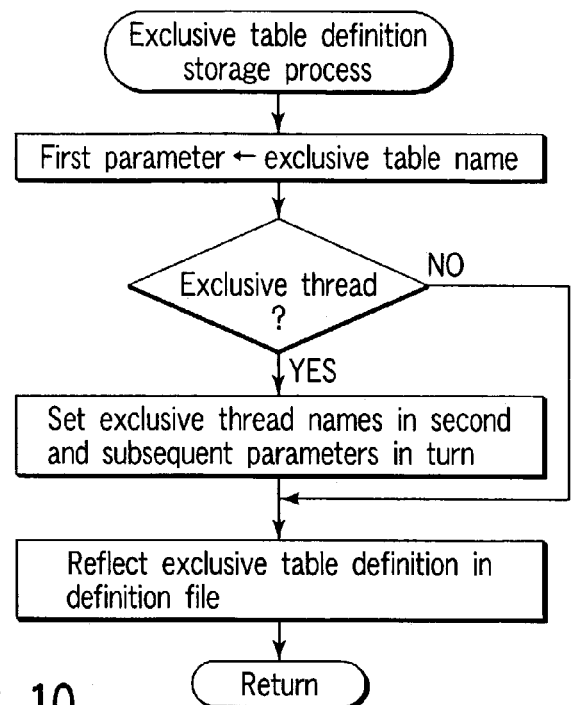
F I G. 10
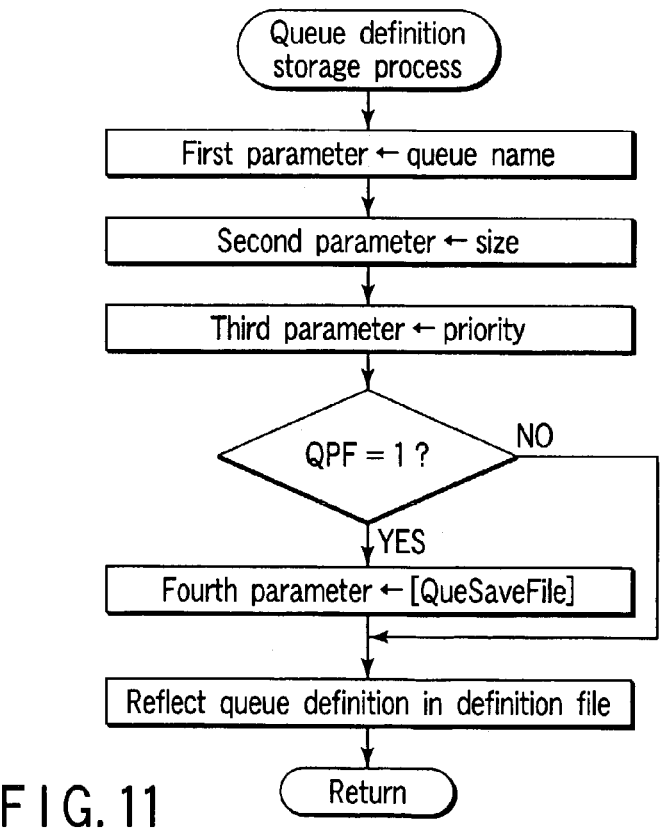
F I G. 11

(a) THREAD_QUE ("Queue name", Queue size, Priority, Save flag)

(b) EXCLUSIVE_JOB ("Exclusive table name", typof (Exclusive thread 1), typof (Exclusive thread 2), ······)

(c) ON_JOB ("Method name", typof (Class name), Thread type, Parallel run count, "Exclusive table name", "Queue name", Thread pool

```
using System;
  using TEC.CM.Core
  namespace[!output PROJECT_NAME]
  {
  ///<summary>
      ///Summary description for MessageThread
    ///<summary>
  ///
    public class Message Thread:MessageThreadBase
  {
    public MessageThread()
  {
  }
    protected override void QUEMAP()
    {
    THREAD_QUE("IteminformationQue", 1, 5);
    THREAD_QUE("IteminformationChange", 1, 10, QuesaveFile);
    }
    protected override void EXCLUSIVEMAP()
    {
    EXCLUSIVE_JOB("ItemExclusivetable", typof(ItemChange),typof(ItemInformation));
    EXCLUSIVE_JOB("Ex1, typof(ItemChange));
    }
    protected override void JOBMAP()
    {
    ON_JOB("Item*", typeof(ItemAsterisk), DYNAMIC, 0, null, UseMsThreadPool);
    ON_JOB("ItemChange", typeof(ItemChange), RESIDENCE, 0, null);
    }
    protected override bool Init()
                  ⋮
```

FIG. 17

```
using System;
using System Threading;
using TEC.CM.Core
namespace[!output PROJECT_NAME]
{
    ///<summary>
        /// "Briefing of FUNC_NAME"
    ///<summary>
    public class FUNC_NAME: jobThredSinglecall
        {
        public FUNC_NAME()
    {
    //
    //TODO: "Initial process"
        //
    }
        protected override int Init()
        {
            //
            //TODO: "Start process"
            //
            return0;
        }
        protected override int Proc()
        {
            //
                //TODO: "Main logic"
    //
            return0;
        }
        protected override int Final()
        {
            //
            //TODO: "End process"
    //
            switch (EndStatus)
            {
                case JobThreadEndStatus. Success;
                            break
                case JobThreadEndStatus. InitError;
                            break
                case JobThreadEndStatus. StopException;
                            break
                case JobThreadEndStatus. Exception;
                            break
                default;
            break
                }
                return();
        }
        }
}
```

FIG. 18

1
APPARATUS, METHOD, AND PROGRAM PRODUCT FOR SUPPORTING PROGRAMMING

CROSS-REFERENCE TO RELATED APPLICATIONS

This application is based upon and claims the benefit of priority from the prior Japanese Patent Application No. 2002-142472, filed May 17, 2002, the entire contents of which are incorporated herein by reference.

BACKGROUND OF THE INVENTION

1. Field of the Invention

The present invention relates to an apparatus, method, and program product, which support efficient programming of a multithread-compatible object program on a computer.

2. Description of the Related Art

A multithread-compatible object program (application software, utility software, or the like) can execute in parallel a plurality of processing units called threads. Upon programming such program product on a computer, source files for respective threads, and one definition file must be created. Each source file stores source code which represents execution contents of the corresponding thread. The source code is a design of software described using a programming language. The definition file stores thread definition information which defines execution conditions of respective threads.

After a programmer creates source files and a definition file on a computer, he or she launches a predetermined compiler. Then, the source files and definition file are compiled to generate a multithread-compatible object program. The compiler is software for converting the source codes into object codes. The object code is a program described in a machine language that the computer can interpret.

Conventionally, it is a common practice to create source files and a definition file using text file edit software called an editor. When this software is used, the programmer sequentially inputs source code and thread definition information as text data character by character by operating keys on a keyboard, thereby creating the source files and definition file. For this reason, the programmer must understand the meaning and way to use of each individual source code and thread definition information. Then, the programmer must describe the source code and thread definition information at appropriate locations of the source files and definition files in an appropriate order using text data with appropriate spelling.

A programming beginner must spend much time as well as learning time until he or she develops a program. Also, the text data input operation is troublesome and time consuming. In addition, compiling often fails due to input errors in the source code and thread definition information.

BRIEF SUMMARY OF THE INVENTION

It is, therefore, required to provide a programming support apparatus, method, and program product, which allow even a beginner to easily do programming jobs without any errors.

According to embodiments of the present invention, there is provided a programming support apparatus comprising:

a template file which stores templates of source code that are set in correspondence with types of threads;

a definition file which stores definition information of the thread;

means for displaying, on a display of a computer system, a GUI dialog box that allows to set. an identification name and thread type of a source file which stores the source code of the thread;

means for, when the identification name and thread type of the source file are set via the GUI dialog box, acquiring the template corresponding to the thread type from the template file;

means for reflecting the identification name set via the GUI dialog box on a source code of the template acquired from the template file;

means for generating a source file with the identification name set via the GUI dialog box on the basis of the source code of the template; and means for storing, in the definition file, the identification name and thread type set via the GUI dialog box as thread definition information of the source file set with the identification name.

According to embodiments of the present invention, there is provided a programming support method comprising:

displaying, on a display of a computer system, a GUI dialog box that allows to set an identification name and thread type of a source file which stores source code of a thread;

acquiring, when the identification name and thread type of the source file are set via the GUI dialog box, a template corresponding to the thread type;

reflecting the identification name set via the GUI dialog box on source code of the acquired template;

generating a source file with the identification name set via the GUI dialog box on the basis of the source code of the template; and storing, in a definition file, the identification name and thread type set via the GUI dialog box as thread definition information of the source file set with the identification name.

According to embodiments of the present invention, there is provided a programming support program for making a computer system execute steps of:

displaying, on a display of a computer system, a GUI dialog box that allows to set an identification name and thread type of a source file which stores source code of a thread;

acquiring, when the identification name and thread type of the source file are set via the GUI dialog box, a template corresponding to the thread type;

reflecting the identification name set via the GUI dialog box on source code of the acquired template;

generating a source file with the identification name set via the GUI dialog box on the basis of the source code of the template; and storing, in a definition file, the identification name and thread type set via the GUI dialog box as thread definition information of the source file set with the identification name.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below serve to explain the principles of the invention.

FIG. 10 is a flowchart showing details of an exclusive table definition storage process in FIG. 9;

FIG. 11 is a flowchart showing details of a queue definition storage process in FIG. 9;

FIG. 17 shows an example of a definition file; and

FIG. 18 shows an example of a template file "DYNAMIC".

DETAILED DESCRIPTION OF THE INVENTION

An embodiment of the present invention will be described hereinafter using the accompanying drawings.

Note that this embodiment is applied to a case wherein programming of a multithread-compatible object program is supported on a computer system. In this embodiment, parallel execution of a plurality of processes by one object program is called a multithread process, and each individual processing unit is called a thread.

Figure 1:
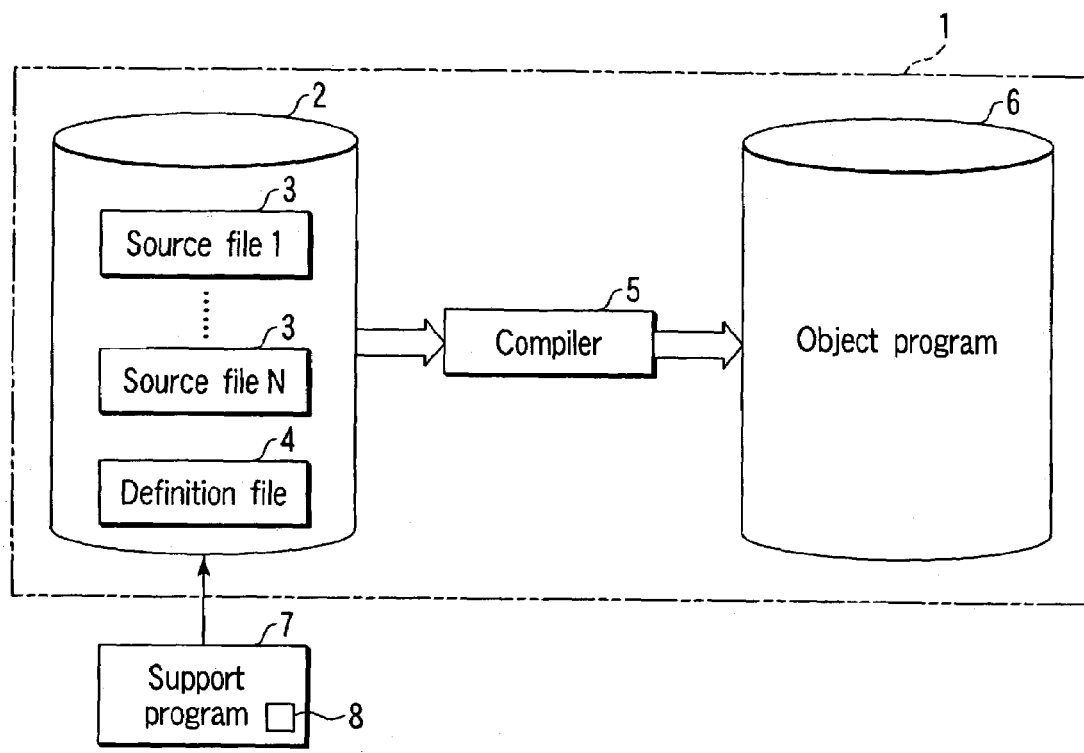
FIG. 1 is a block diagram for explaining an outline of programming in an embodiment of the present invention.

An outline of programming in this embodiment will be described first using FIG. 1.

The first step of programming is creation of a source program 2 on a computer system 1. The computer system 1 comprises, e.g., a personal computer, workstation, or the like. The source program 2 consists of source files 3 for respective threads, and one definition file 4. Each source file 3 stores source code indicating the execution contents of the corresponding thread. The definition file 4 stores thread definition information that defines the execution conditions and the like of respective threads.

The second step of programming is compiling of the source program 2 by a compiler 5. The compiler 5 compiles the descriptions of the source files 3 and definition file 4 into a compiler language.

Compiling the source program 2 generates an object program 6 as a desired object.

A support program 7 runs on the computer system 1 to support the first step of programming. The support program 7 includes a template file 8. The template file 8 will be described later.

Figure 2:
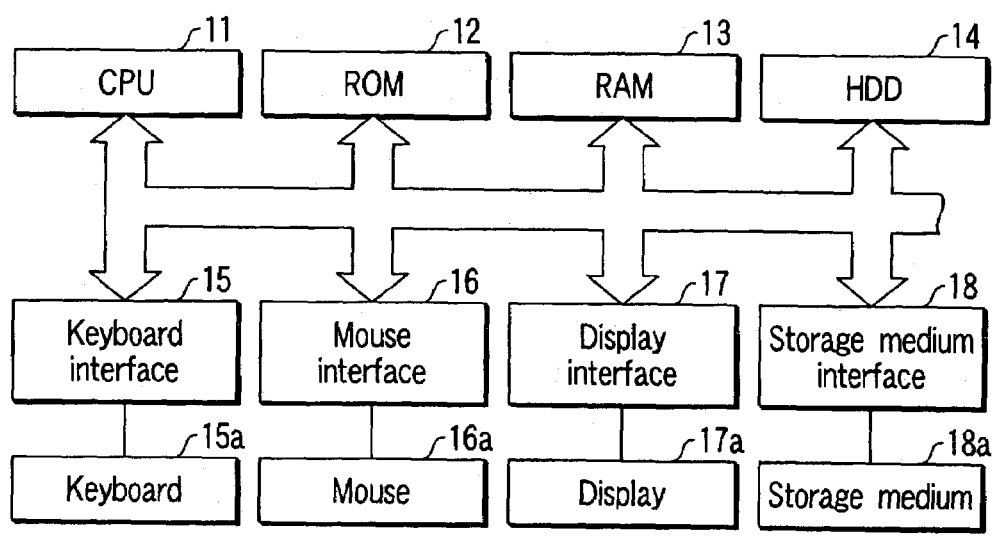
FIG. 2 is a block diagram showing the principal hardware arrangement of a computer in the embodiment.

FIG. 2 is a block diagram showing the principal hardware arrangement of the computer system 1. The computer system 1 comprises a CPU (Central Processing Unit) 11 which forms a main controller, a ROM (Read Only Memory) 12 and RAM (Random Access Memory) 13 which form a main storage unit, an HDD (Hard Disk Drive) device 14 which forms an auxiliary storage device, and various input/output interfaces such as a keyboard interface 15, mouse interface 16, display interface 17, storage medium interface 18, and the like. The CPU 11, ROM 12, RAM 13, HDD device 14, and various input/output interfaces 15, 16, 17, and 18 are connected to a bus line 19 which includes an address bus, data bus, and the like.

A keyboard 15a on which character keys, numerical keys, a space key, an enter key, cursor keys, function keys, and the like are arranged is connected to the keyboard interface 15. A display device 17a such as a liquid crystal display, CRT display, or the like is connected to the display interface 17. A mouse 16a is connected to the mouse interface 16. The mouse 16a is a pointing device used to move a pointer displayed on the screen of the display device 17a. A storage medium 18a such as a flexible disk, CD-ROM, or the like is connected to the storage medium interface 18.

The support program 7 stored in the storage medium 18a is read by the computer system 1 via the storage medium interface 18, and is stored in the HDD device 14. When the computer system 1 has a wired or wireless communication interface, the support program 7 may be stored in the HDD device 14 via a communication medium.

The operation of the computer system 1 installed with the programming support program 7 will be described below using the flowcharts of FIGS. 3 to 12.

Figure 3:
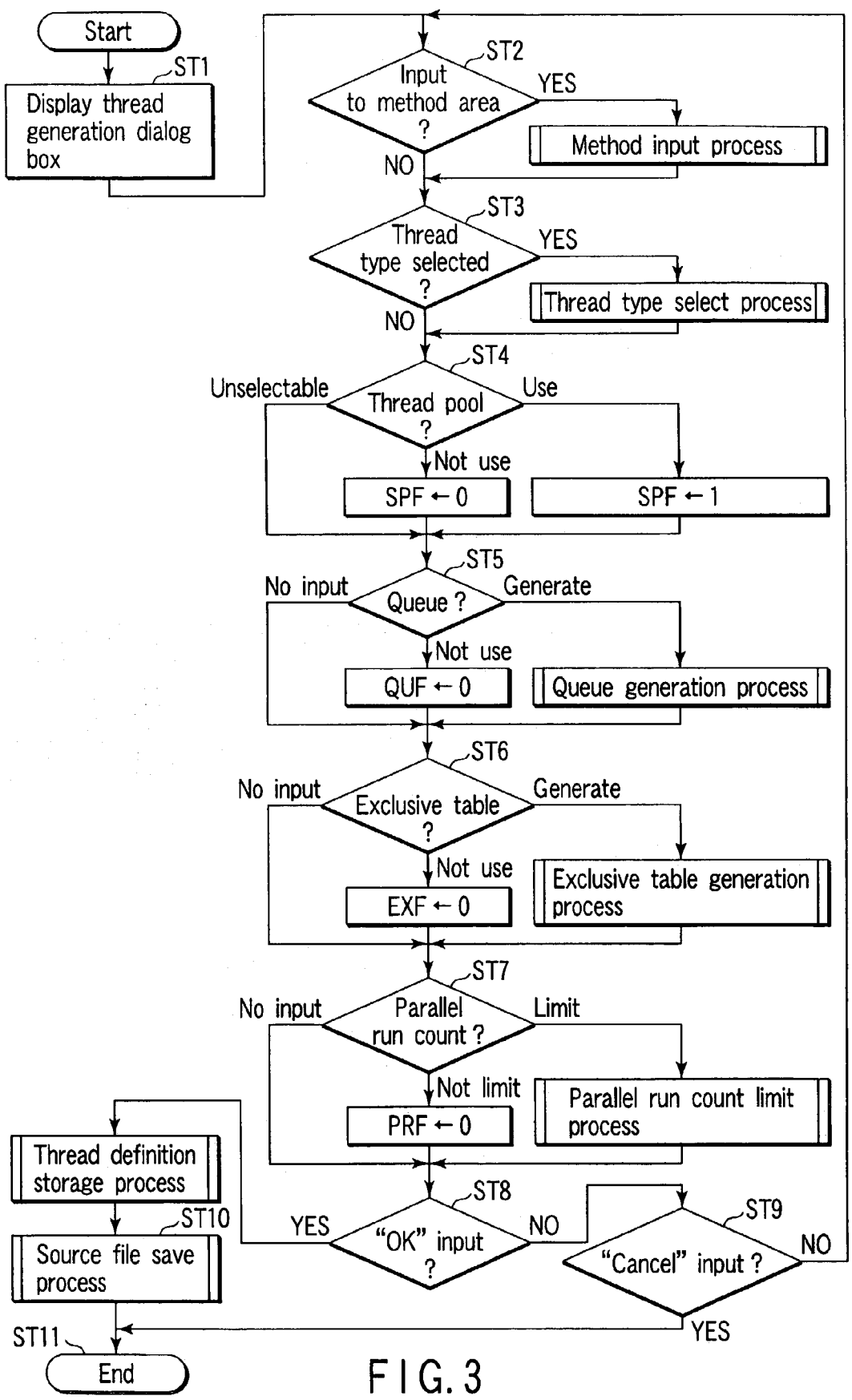
FIG. 3 is a flowchart showing principal processes of a programming support program executed by a CPU of the embodiment.
Figure 4:
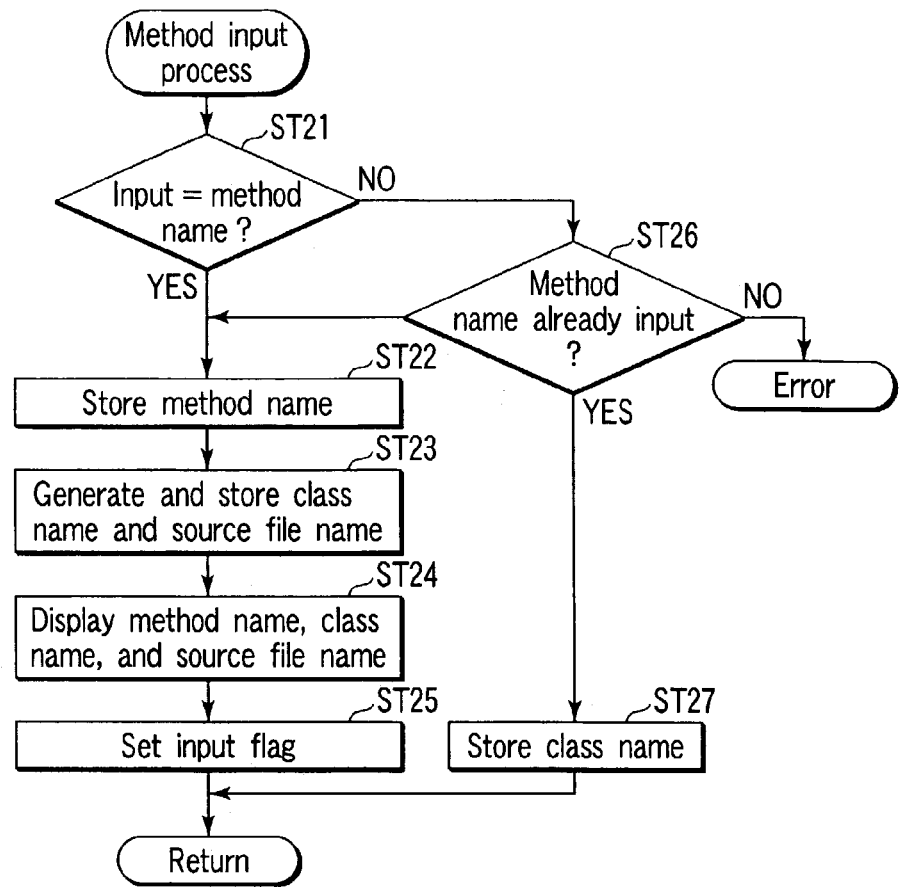
FIG. 4 is a flowchart showing details of a method input process in FIG. 3.
Figure 5:
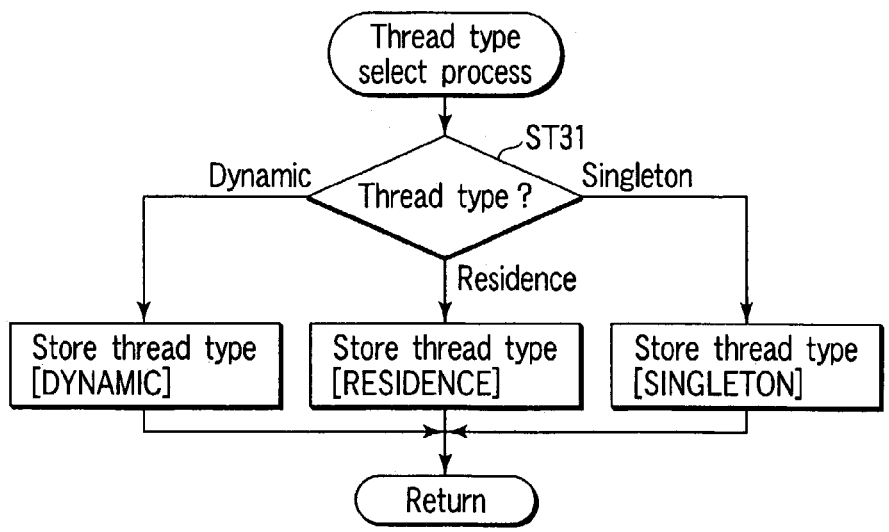
FIG. 5 is a flowchart showing details of a thread type select process in FIG. 3.
Figure 6:
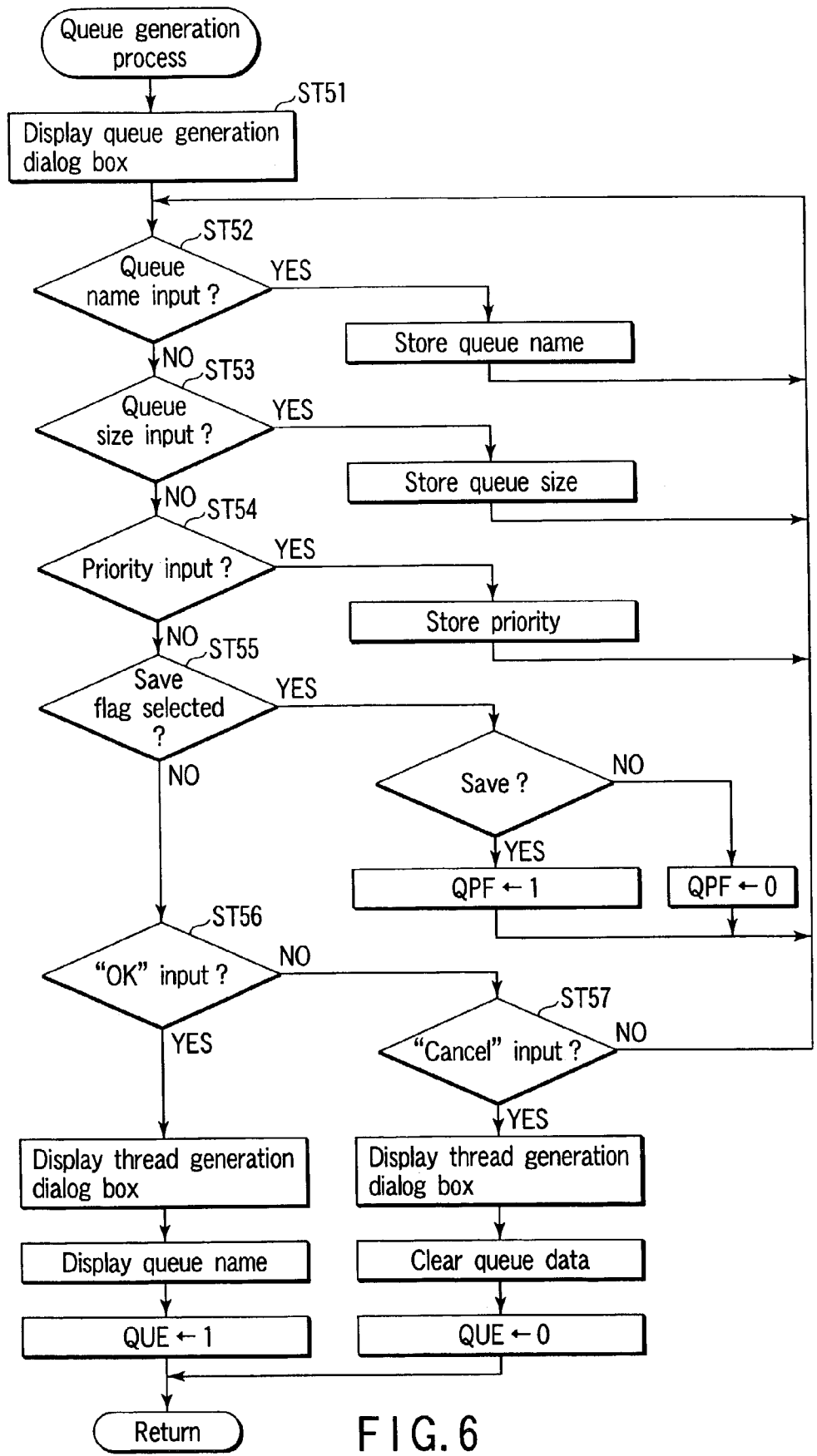
FIG. 6 is a flowchart showing details of a queue generation process in FIG. 3.
Figure 7:
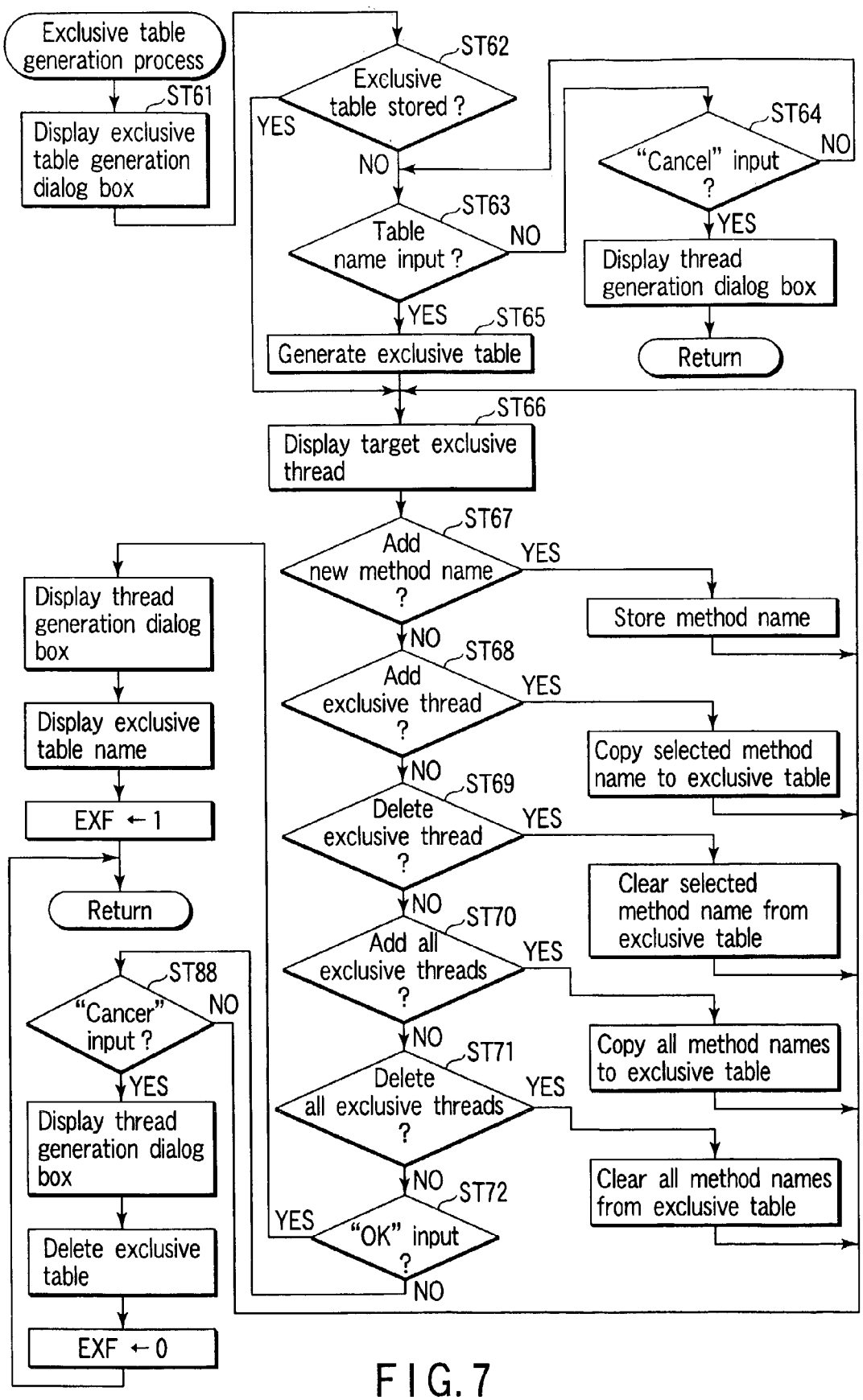
FIG. 7 is a flowchart showing details of an exclusive table generation process in FIG. 3.
Figure 8:
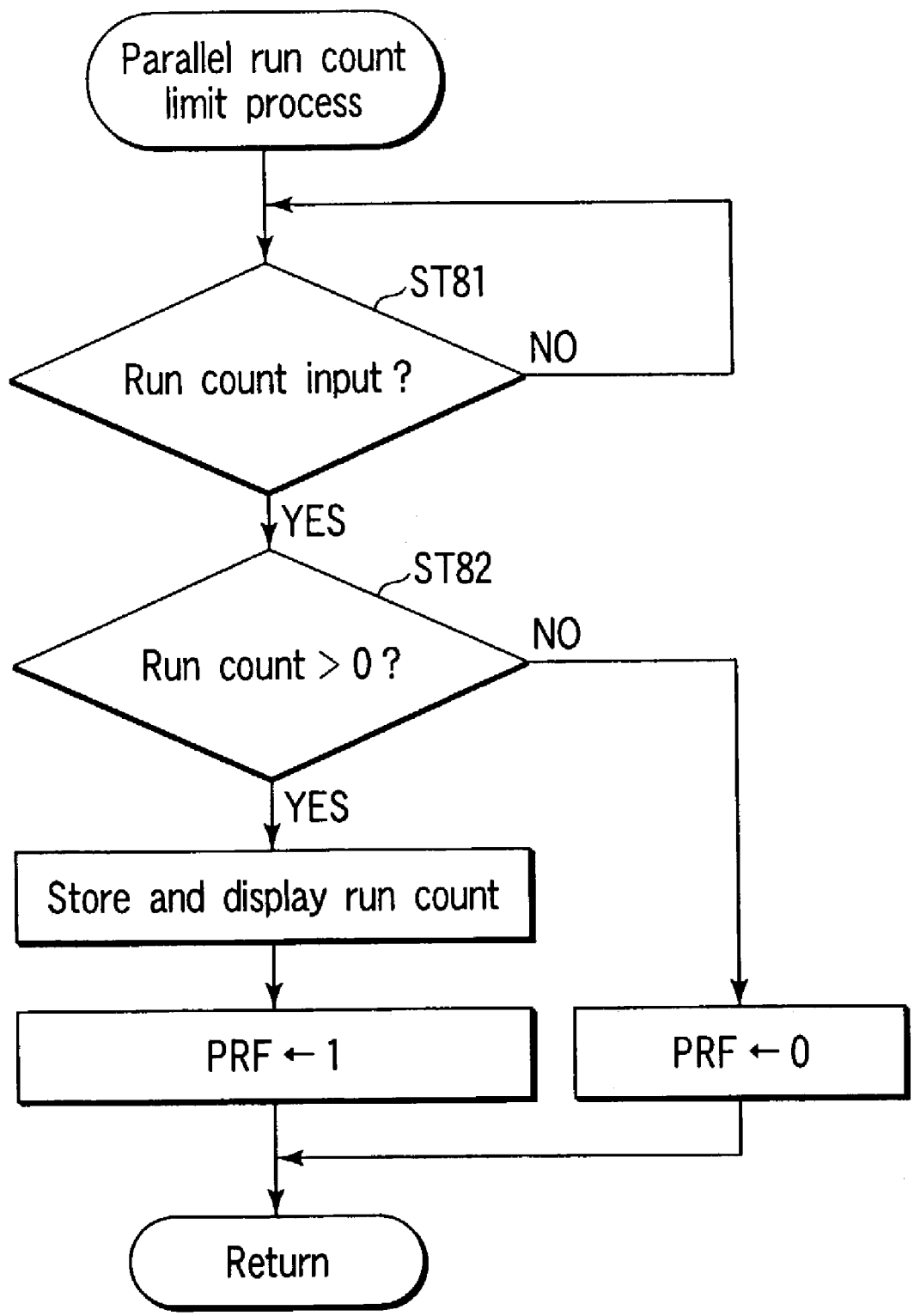
FIG. 8 is a flowchart showing details of a parallel run count limit process in FIG. 3.
Figure 9:
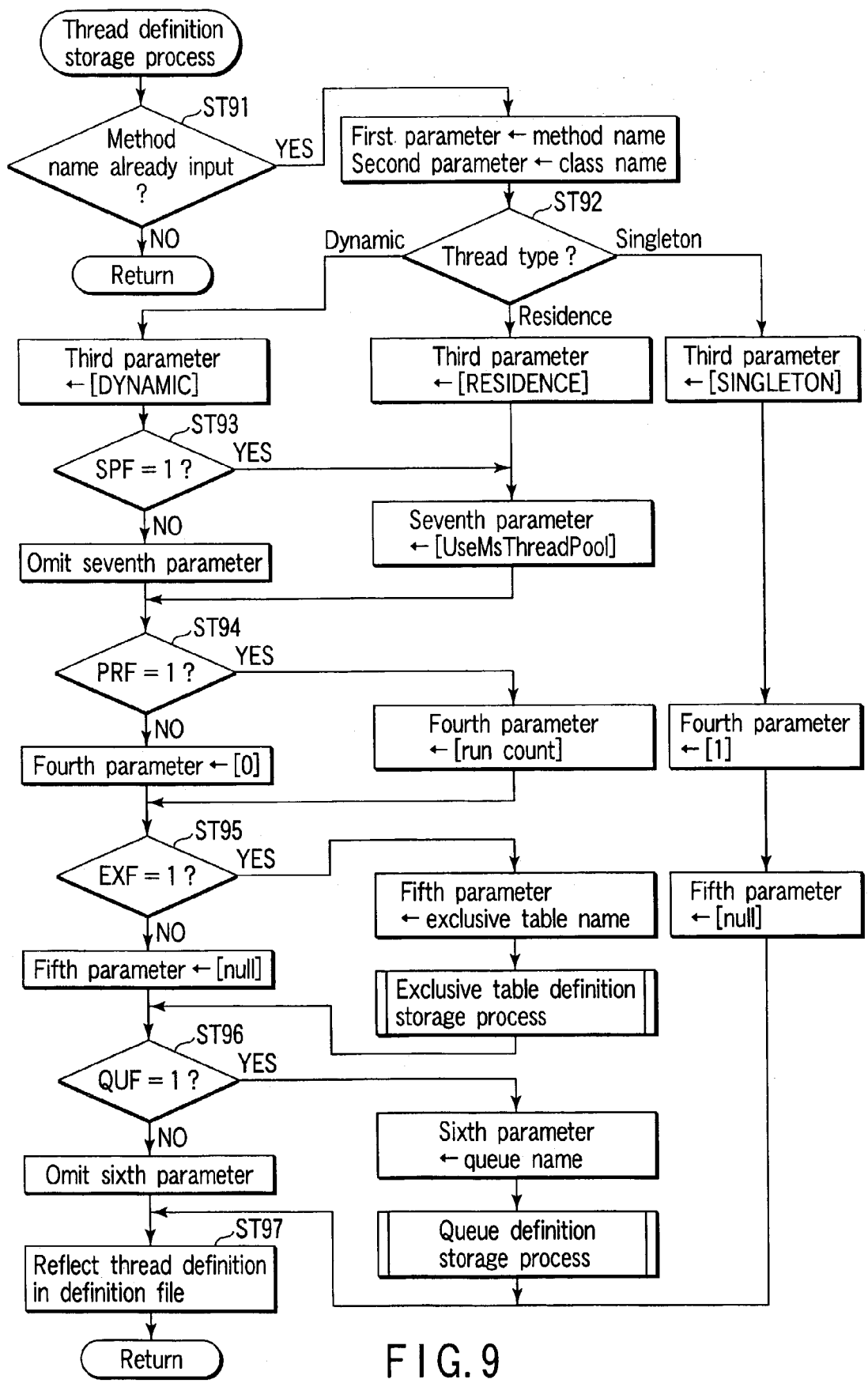
FIG. 9 is a flowchart showing details of a thread definition storage process in FIG. 3.
Figure 12:
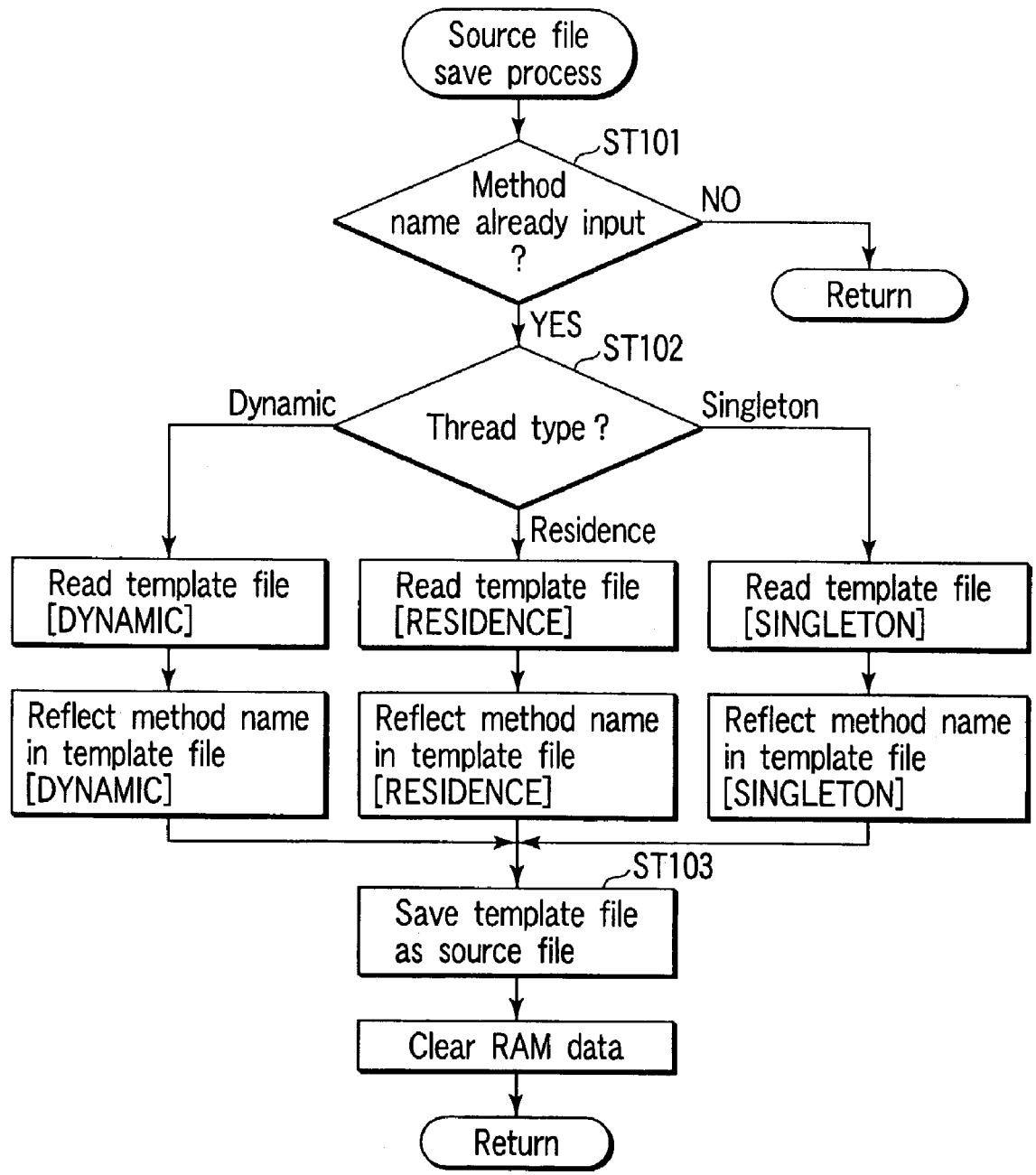
FIG. 12 is a flowchart showing details of a source file save process in FIG. 3.

When the programming support program 7 is launched on the computer system 1, the CPU 11 starts a main process in FIG. 3.

The CPU 11 displays a thread generation dialog box on the display device 17a using a GUI (Graphical User Interface) in ST (step) 1.

Figure 13:
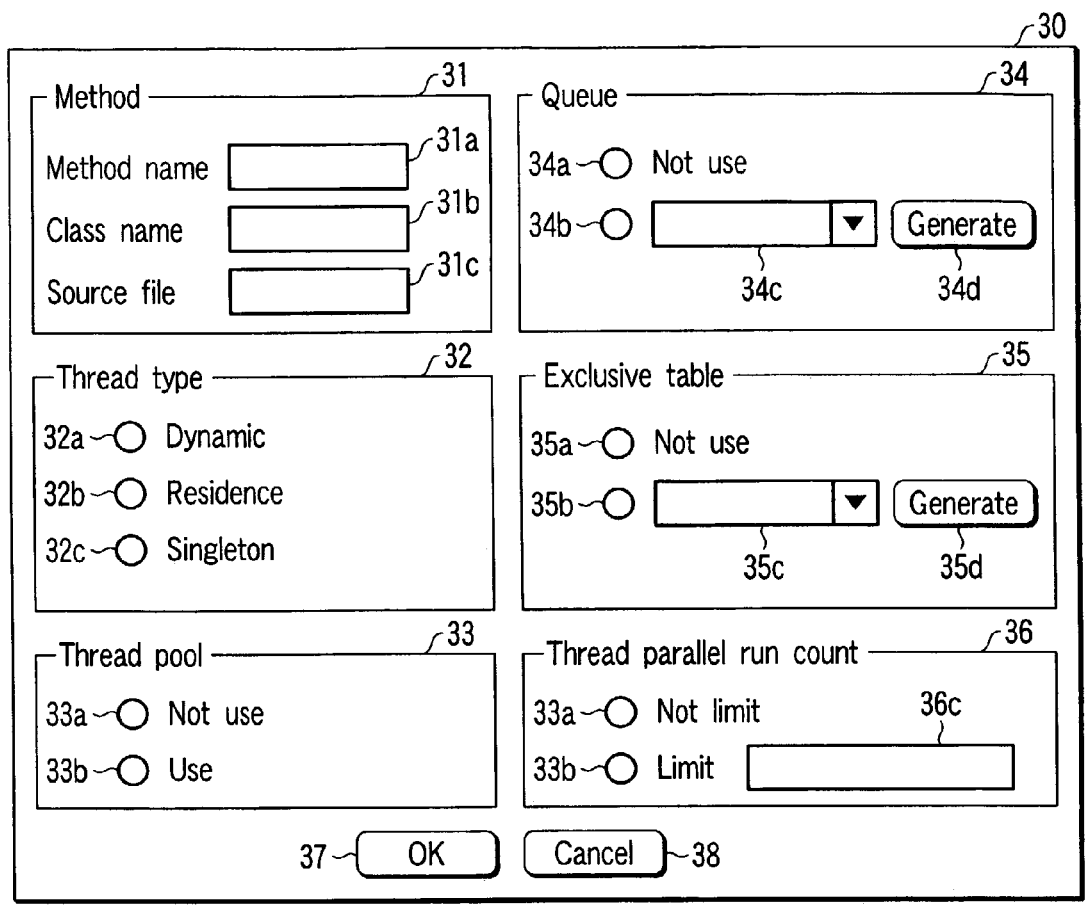
FIG. 13 shows an example of a thread generation dialog box.

FIG. 13 shows an example of the thread generation dialog box. On a thread generation dialog box 30, a method area 31, thread type area 32, thread pool area 33, queue area 34, exclusive table area 35, and thread parallel run count area 36 are formed. Also, an OK button 37 and cancel button 38 are provided.

On the method area 31, a method name field 31a as an identification name of each source file 3, a class name field 31b, and a source file name field 31c are formed. The method name field 31a displays a method name as the identification name of each source file 3. On the method area 31, an operator (programmer) can input a desired method name from the keyboard 15a by designating the method name field 31a by the pointer. Also, the operator (programmer) can input a desired class name from the keyboard 15a by designating the class name field 31b by the pointer.

On the thread type area 32, selectors 32a, 32b, and 32c of three different thread types ("Dynamic", "Residence", and "Singleton") are formed. Each of the selectors 32a, 32b, and 32c is operated to designate the thread type of the source file whose file name is displayed in the source file name field 31c. The thread type classifies various threads by their operation differences upon execution.

A thread which belongs to a thread type "Dynamic" is a nonresident thread. This thread is dynamically generated in response to a process request message, and executes a process.

A thread which belongs to a thread type "Residence" is a resident thread. This thread is mapped to a memory upon launching a process, and controls to execute a job logic part in response to a process request message.

A thread which belongs to a thread type "Singleton" is a resident thread. This thread controls to continuously execute a resident thread of a single instance.

On the thread pool area 33, selectors 33a and 33b used to select whether or not a thread pool is used are formed. The thread pool is selectable for a thread of thread type "Dynamic". A thread of thread type "Residence" inevitably uses the thread pool. A thread of thread type "Singleton" does not use the thread pool.

On the queue area 34, selectors 34a and 34b used to select whether or not message queuing is used, a queue name field 34c, and a button 34d used to instruct generation of a queue are formed. Message queuing is a method of storing busy received messages (process requests) in a buffer called a queue and executing them in turn. Message queuing is selectable for a thread of both thread type "Dynamic" and "Residence". A thread of thread type "Singleton" does not use message queuing. The queue name field 34c displays queue names as a pull-down menu.

On the exclusive table area 35, selectors 35a and 35b used to select whether or not exclusive control is made, a table name field 35c, and a button 35d used to instruct generation of an exclusive table are formed. Exclusive control is selectable for a thread of both thread type "Dynamic" and "Residence". A thread of thread type "Singleton" does not make exclusive control. The table name field 35c displays the names of exclusive tables as a pull-down menu. An exclusive table is assured in the RAM 13 to register the names of threads that make exclusive control.

On the thread parallel run count area 36, selectors 36a and 36b used to select whether or not the parallel run count is limited, and a parallel run count field 36c are formed. The parallel run count is the maximum number of threads that can run in parallel. The parallel run count is selectable for a thread of both thread type "Dynamic" and "Residence". The parallel run count of a thread of thread type "Singleton" is fixed to "1". The parallel run count field 36c displays a parallel run count.

The CPU 11 prompts the operator (programmer) to set the method name and thread type by displaying the thread generation dialog box 30. Also, the CPU 11 prompts the operator (programmer) to set the thread execution conditions such as the thread pool, message queuing, exclusive control, parallel run count, and the like by displaying the thread generation dialog box 30.

After the thread generation dialog box 30 is displayed, the CPU 11 checks in ST2 if text data is input to the method name field 31a or class name field 31b on the method area 31. If no text data is input, the CPU 11 advances to a process of ST3.

If text data is input, the CPU 11 executes a method input process. This process will be described in detail below using the flowchart of FIG. 4.

The CPU 11 determines in ST21 whether the text data is input to the method name field 31a or class name field 31b.

If the text data is input to the method name field 31a, the CPU 11 stores that text data in the RAM 13 as a method name in ST22. The CPU 11 automatically generates a class name and source file name on the basis of the method name in ST23. The CPU 11 stores the class name and source file name in the RAM 13.

The CPU 11 displays the class name and source file name in the class name field 31b and source file name field 31c in the method area 31 in ST24. The CPU 11 sets a method name input flag to "1" in ST25. The input flag is stored in the RAM 13.

If the text data is input to the class name field 31b, the CPU 11 checks in ST26 if the input flag is "1". If the input flag is not "1", the CPU 11 determines an error since the class name is input prior to a method name.

If the input flag is "1", the CPU 11 rewrites the class name stored in the RAM 13 by the text data input to the class name field 31b in ST27.

Upon completion of the method input process, the CPU 11 advances to the process of ST3.

The CPU 11 checks in ST3 if one of the selectors 32a, 32b, and 32c on the thread type area 32 is selected. If none of these selectors is selected, the CPU 11 advances to a process of ST4.

If one of the selectors 32a, 32b, and 32c is selected, the CPU 11 executes a thread type select process. This process will be described in detail below using the flowchart of FIG. 5.

The RAM 13 stores "DYNAMIC" as default data of thread type identification data.

The CPU 11 determines a thread type corresponding to the selected one of the selectors 32a, 32b, and 32c in ST31. If the selector 32a corresponding to thread type "Dynamic" is selected, the CPU 11 rewrites the thread type identification data stored in the RAM 13 to "DYNAMIC". If the selector 32b corresponding to thread type "Residence" is selected, the CPU 11 rewrites the thread type identification data in the RAM 13 to "RESIDENCE". If the selector 32c corresponding to thread type "Singleton" is selected, the CPU 11 rewrites the thread type identification data in the RAM 13 to "SINGLETON".

Note that thread type identification data "DYNAMIC" is used as default data. However, data "RESIDENCE" or "SINGLETON" may be used instead.

Upon completion of the thread type select process, the CPU 11 advances to the process of ST4.

The CPU 11 checks in ST4 if one of the selectors 33a and 33b on the thread pool area 33 is selected. If the selector 33a corresponding to "not use thread pool" is selected, the CPU 11 sets a thread pool flag SPF to "0". If the selector 33b corresponding to "use thread pool" is selected, the CPU 11 sets the thread pool flag SPF to "1". The thread pool flag SPF is stored in the RAM 13.

The selectors 33a and 33b are selectable when thread type "Dynamic" or "Residence" is selected. When thread type "Singleton" is selected, the selectors 33a and 33b cannot be selected. The thread pool flag SPF is automatically set to "1" when thread type "Singleton" is selected.

The CPU 11 checks the presence/absence of input to the queue area 34 in ST5. If no input is detected, the CPU 11 advances to a process of ST6.

If the selector 34a corresponding to "not use message queuing" is selected, the CPU 11 sets a queue flag QUF to "0". The queue flag QUF is stored in the RAM 13. After that, the CPU 11 advances to the process of ST6.

If the queue generation button 34*d* is input, the CPU 11 executes a queue generation process. This process will be described in detail below using the flow chart of FIG. 6.

The CPU 11 displays a queue generation dialog box on the display device 17*a* using the GUI in ST51.

Figure 14:
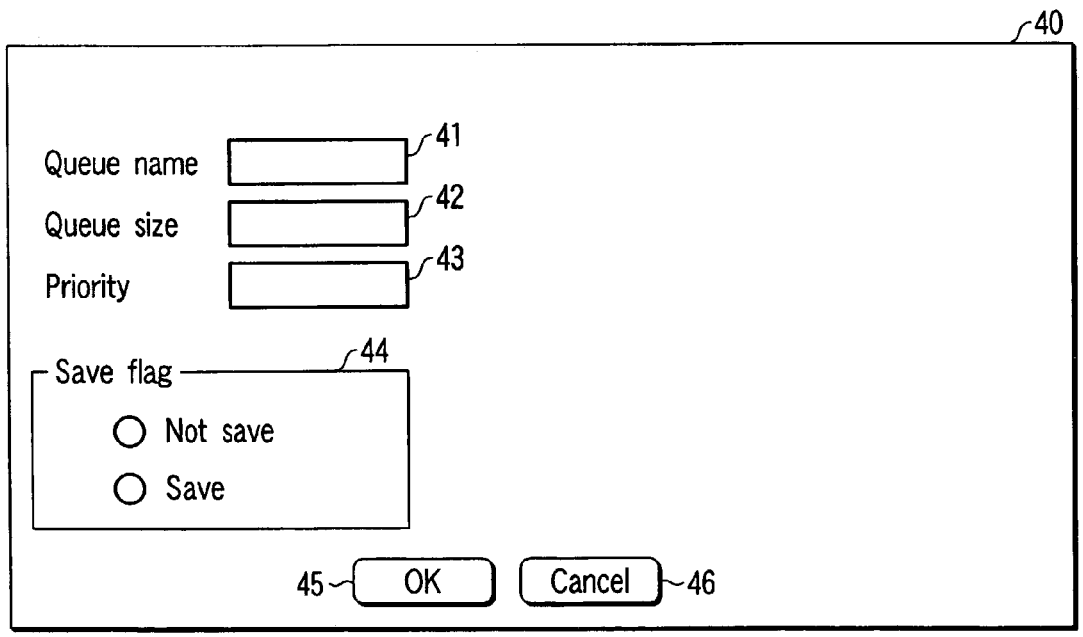
FIG. 14 shows an example of a queue generation dialog box.

FIG. 14 shows an example of the queue generation dialog box. On a queue generation dialog box 40, a queue name field 41, queue size field 42, priority field 43, and save flag area 44 are formed. Also, an OK button 45 and cancel button 46 are provided. On the save flag area 44, selectors 44*a* and 44*b* used to select whether or not a save flag is saved are formed.

The CPU 11 prompts the operator (programmer) to set the queue name, queue size, priority, and save flag by displaying the queue generation dialog box 40.

The queue size indicates the number of messages [1 to 99999] that can be stored in the queue. The priority is that of the queue, and is set in 10 levels. Priority=1 is the top priority. Lower-priority queues are not executed until all higher-priority queues are processed. If the save flag is set to "save", an unprocessed queue is saved in a file upon completion of a process. The saved queue is read out from the file and is processed upon launching of the process next time.

If text data is input to the queue name field 41 in ST52, the CPU 11 stores that text data in the RAM 13 as a queue name.

If numerical value data is input to the queue size field 42 within the range from 1 to 99999 in ST53, the CPU 11 stores that numerical value data in the RAM 13 as a queue size.

If numerical value data is input to the priority field 43 within the range from 1 to 10 in ST54, the CPU 11 stores that numerical value data in the RAM 13 as a priority level.

If one of the selectors 44*a* and 44*b* on the save flag area 44 is selected in step S55, the CPU 11 determines the selector that has been selected. If the selector 44*a* corresponding to "not save save flag" is selected, the CPU 11 sets a queue save flag QPF to "0". If the selector 44*b* corresponding to "save save flag" is input, the CPU 11 sets the queue save flag QPF to "1".

If the OK button 45 is input in ST56, the CPU 11 controls the screen display on the display device 17*a* to go back to the thread generation dialog box 30. Then, the CPU 11 displays the queue name stored in the RAM 13 on the queue name field 34*c* on the thread generation dialog box 30. After that, the CPU 11 sets the queue flag QUF to "1", and advances to the process of ST6.

If the cancel button 46 is input in ST57, the CPU 11 controls the screen display on the display device 17*a* to go back to the thread generation dialog box 30. The CPU 11 clears data (queue name, queue size, priority, save flag) which are stored in the RAM 13 and associated with message queuing. The CPU 11 sets the queue flag QUF to "0" if it is "1", and advances to the process of ST6.

The CPU 11 checks the presence/absence of input to the exclusive table area 35 in ST6. If no input is detected, the CPU 11 advances to a process of ST7.

If the selector 35*a* corresponding to "not use exclusive table (not make exclusive control)" is selected, the CPU 11 sets an exclusive table flag EXF to "0". The exclusive table flag EXF is stored in the RAM 13. After that, the CPU 11 advances to the process of ST7.

If the exclusive table generation button 35*d* is input, the CPU 11 executes an exclusive table generation process. This process will be described in detail below using the flowchart of FIG. 7.

The CPU 11 displays an exclusive table generation dialog box on the display device 17*a* using the GUI in ST61.

Figures 15, 16:
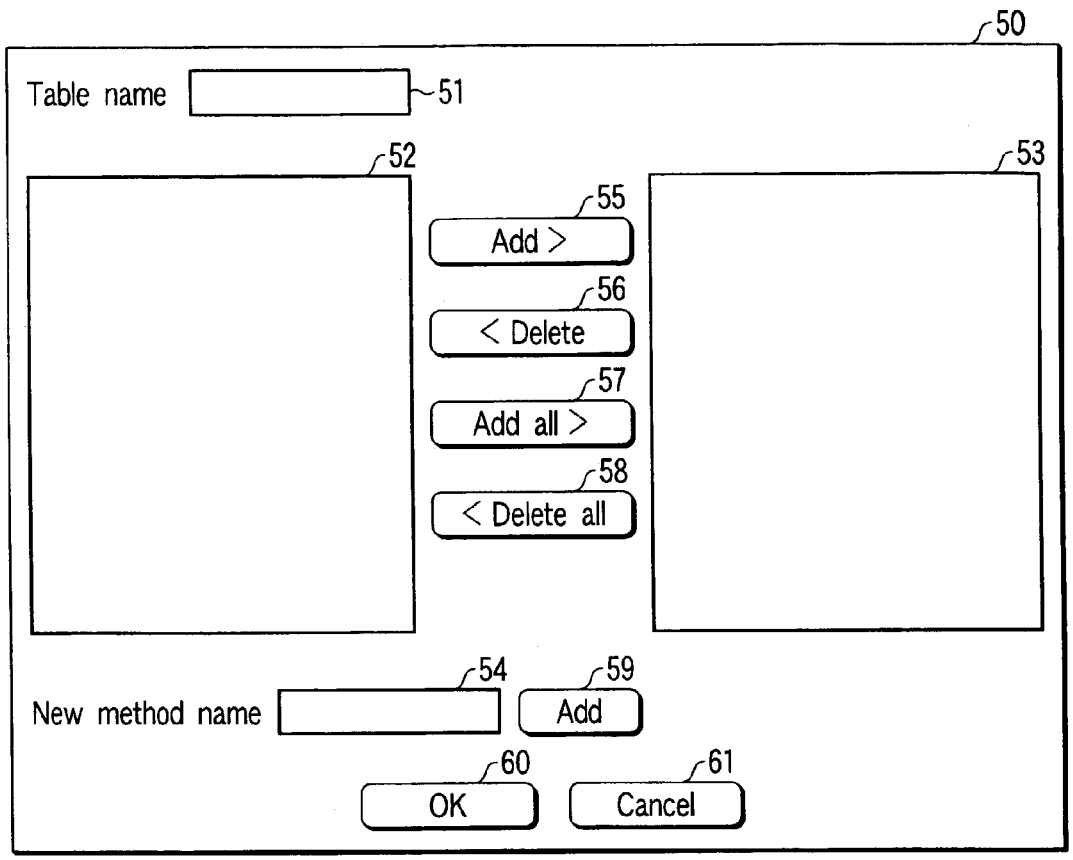
FIG. 15 shows an example of an exclusive table generation dialog box.
FIG. 16 shows the format of various definition records.

FIG. 15 shows an example of the exclusive table generation dialog box. On an exclusive table generation dialog box 50, a table name field 51, a method name list field 52 of a target thread, a method name list field 53 of an exclusive thread, and a new method name field 54 are formed. Also, an add button 55 and delete button 56 of an exclusive thread, an all add button 57, an all delete button 58, an add button 59 of a new method name, an OK button 60, and a cancel button 61 are laid out.

The CPU 11 prompts the operator (programmer) to select a thread which is to undergo exclusive control by displaying the exclusive table generation dialog box 50.

The CPU 11 checks in ST62 if an exclusive table is stored in the RAM 13. If no exclusive table is stored, the CPU 11 waits for input of an exclusive table name in ST63. If the cancel button 61 is input in ST64, the CPU 11 controls the screen display of the display device 17*a* to go back to the thread generation dialog box 30, and advances to the process of ST7.

If a table name of an exclusive table is input to the table name field 51, the CPU 11 generates an exclusive table with that table name in the RAM 13 in ST65. The CPU 11 displays all method names stored in the RAM 13 in the method name list field 52 in ST66. At this time, since the exclusive table does not store any method name of the thread which is to undergo exclusive control, nothing is displayed in the method name list field 53.

If the exclusive table has already been stored in the RAM 13 in ST62, the CPU 11 jumps to a process of ST66.

The CPU 11 displays method names stored in the exclusive table in the method name list field 53, and the remaining method names stored in the RAM 13 in the method name list field 52 in ST66.

Upon completion of the process of ST66, the CPU 11 waits for input of one of the buttons 55 to 61.

If the add button 59 of a new method name is input in ST67, the CPU 11 stores a method name input to the new method name field 54 in the RAM 13. After the method name is stored, the CPU 11 updates the display contents on the method name list fields 52 and 53. The CPU 11 then waits for input of one of the buttons 55 to 61 again.

If the exclusive thread add button 55 is input in ST68, the CPU 11 copies a selected one of method names displayed in the method name list field 52 to the exclusive table on the RAM 13. After the method name is copied to the exclusive table, the CPU 11 updates the display contents in the method name list fields 52 and 53. The CPU 11 then waits for input of one of the buttons 55 to 61 again.

If the exclusive thread delete button 56 is input in ST69, the CPU 11 deletes a selected one of the method names displayed in the method name list field 53 from the exclusive table. After the method name is deleted from the exclusive table, the CPU 11 updates the display contents in the method name list fields 52 and 53. The CPU 11 then waits for input of one of the buttons 55 to 61 again.

If the all add button 57 is input in ST70, the CPU 11 copies all the method names displayed in the method name list field 52 to the exclusive table in the RAM 13. After all the method names are copied to the exclusive table, the CPU 11 updates the display contents in the method name list fields 52 and 53. The CPU 11 then waits for input of one of the buttons 55 to 61 again.

If the all delete button 58 is input in ST71, the CPU 11 deletes all the method names displayed in the method name list field 53 from the exclusive table. After all the method names are deleted from the exclusive table, the CPU 11 updates the display contents in the method name list fields 52 and 53. The CPU 11 then waits for input of one of the buttons 55 to 61 again.

If the OK button 60 is input in ST72, the CPU 11 controls the screen display on the display device 17a to go back to the thread generation dialog box 30. The CPU 11 displays the exclusive table name stored in the RAM 13 in the table name field 35c in the thread generation dialog box 30. The CPU 11 sets the exclusive flag table EXF to "1", and advances to the process of ST7.

If the cancel button 61 is input in ST73, the CPU 11 controls the screen display on the display device 17a to go back to the thread generation dialog box 30. The CPU 11 deletes the exclusive table stored in the RAM 13. The CPU 11 sets the exclusive flag table EXF to "0" if it is "1", and advances to the process of ST7.

The CPU 11 checks the presence/absence of input to the parallel run count area 36 in ST7. If no input is detected, the CPU 11 advances to a process of ST8.

If the selector 36a corresponding to "not limit parallel run count" is selected, the CPU 11 sets a parallel run count flag PRF to "0". The parallel run count flag PRF is stored in the RAM 13. After that, the CPU 11 advances to the process of ST8.

If the selector 36b corresponding to "limit parallel run count" is selected, the CPU 11 executes a parallel run count limit process. This process will be described in detail below using the flowchart of FIG. 7.

The CPU 11 waits for input of a numerical value not less than 0 to the parallel run count field 36c in the parallel run count area 36 in ST81. If a numerical value is input, the CPU 11 checks in ST82 if the input numerical value is "0".

If a numerical value larger than "0" is input, the CPU 11 stores this numerical value in the RAM 13 as a parallel run count, and displays that numerical value in the parallel run count field 36c. The CPU 11 sets the parallel run count flag PRF to "1", and advances to the process of ST8.

If "0" is input, the CPU 11 checks the parallel run count flag PRF. If the parallel run count flag PRF is "1", the CPU 11 sets the parallel run count flag PRF to "0", and advances to the process of ST8.

The CPU 11 checks in ST8 if the OK button 37 in the thread generation dialog box 30 is input. If the OK button 37 is not input, the CPU 11 checks in ST9 if the cancel button 38 is input. If the cancel button 38 is not input either, the CPU 11 returns to the process of ST2.

If the OK button 37 is input, the CPU 11 executes a thread definition storage process. This process will be described in detail below using the flowchart of FIG. 9.

The CPU 11 checks in ST91 if a method name is input to the method name field 31a in the method area 31. If no method name is input (no method name is stored in the RAM 13), the CPU 11 advances to a process of ST10.

If a method name is input (a method name is stored in the RAM 13), the CPU 11 sets that method name and a corresponding class name in first and second parameters of a thread definition record (ON_JOB). FIG. 16 shows the format of the thread definition record (ON_JOB).

The CPU 11 checks a thread type selected by one of the selectors 32a, 32b, and 32c from the three different thread types in ST92.

If thread type "Singleton" is selected (thread type identification data "SINGLETON" is stored in the RAM 13), the CPU 11 executes the following process.

The CPU 11 sets thread type identification data "SINGLETON", parallel run count [1], and data "null" in third, fourth, and fifth parameters of the thread definition record (ON_JOB), respectively. Data "null" indicates that none of the exclusive table, message queuing, and thread pool are used.

In this manner, since the thread definition record (ON_JOB) is settled, the CPU 11 reflects the thread definition record (ON_JOB) in the definition file 4 of the source program 2 in ST97. After that, the CPU 11 advances to the process of ST10.

If thread type "Residence" is selected (thread type identification data "RESIDENCE" is stored in the RAM 13), the CPU 11 executes the following process.

The CPU 11 sets thread type identification data "RESIDENCE" and data "UseMsThreadPool" in third and seventh parameters of the thread definition record (ON_JOB), respectively. Data "UseMsThreadPool" indicates that the thread pool is used.

The CPU 11 checks the parallel run count flag PRF in ST94. If the parallel run count flag PRF is "0", the CPU 11 sets parallel run count [0] in a fourth parameter of the thread definition record (ON_JOB).

If the parallel run count flag PRF is "1", the CPU 11 sets the parallel run count stored in the RAM 13 in the fourth parameter of the thread definition record (ON_JOB).

The CPU 11 checks the exclusive table flag EXF in ST95. If the exclusive table flag EXF is "0", the CPU 11 sets data "null" in a fifth parameter of the thread definition record (ON_JOB). Data "null" indicates that no exclusive control is made.

If the exclusive table flag EXF is "1", the CPU 11 sets the exclusive table name stored in the RAM 13 in the fifth parameter of the thread definition record (ON_JOB).

The CPU 11 executes an exclusive table definition storage process. The exclusive table definition storage process will be described later.

The CPU 11 checks the queue flag QUF in ST96. If the queue flag QUF is "0", the CPU 11 omits a sixth parameter of the thread definition record (ON_JOB). At this time data "UseMsThreadPool" inserted in the seventh parameter is shifted to the sixth parameter.

If the queue flag QUF is "1", the CPU 11 sets the queue name stored in the RAM 13 in the sixth parameter of the thread definition record (ON_JOB).

The CPU 11 executes a queue definition storage process. The queue definition storage process will be described later.

The CPU 11 reflects the thread definition record (ON_JOB) in the definition file 4 of the source program 2 in ST97. After that, the CPU 11 advances to the process of ST10.

If thread type "Dynamic" is selected (thread type identification data "DYNAMIC" is stored in the RAM 13), the CPU 11 executes the following process.

The CPU 11 sets thread type identification data "DYNAMIC" in the third parameter of the thread definition record (ON_JOB).

The CPU 11 checks the thread pool flag SPF in ST93. If the thread pool flag SPF is "0", the CPU 11 omits the seventh parameter of the thread definition record (ON_JOB). If the thread pool flag SPF is "1", the CPU 11 sets data "UseMsThreadPool" in the seventh parameter.

After that, the CPU 11 executes the processes of ST94 to ST97 in turn as in the case wherein thread type "Residence" is selected. In this way, since the thread definition record (ON_JOB) is settled, the CPU 11 reflects the thread definition record (ON_JOB) in the definition file 4 of the source program 2. After that, the CPU 11 advances to the process of ST10.

The exclusive table storage process will be described below using the flowchart of FIG. 10.

When the exclusive table storage process starts, the CPU 11 sets the exclusive table name stored in the RAM 13 in a first parameter of an exclusive table definition record (EXCLUSIVE_JOB). FIG. 16 shows the format of the exclusive table definition record (EXCLUSIVE_JOB).

The CPU 11 checks if the exclusive table stored in the RAM 13 stores the method names of a thread which is to undergo exclusive control. If method names are stored, the CPU 11 sets all the stored method names in second and subsequent parameters of the exclusive table definition record (EXCLUSIVE_JOB) in turn.

If no method name is stored, the CPU 11 omits the second and subsequent parameters of the exclusive table definition record (EXCLUSIVE_JOB). In this way, since the exclusive table definition record (EXCLUSIVE_JOB) is settled, the CPU 11 reflects the exclusive table definition record (EXCLUSIVE_JOB) in the definition file 4. After that, the CPU 11 advances to the process of ST96.

The queue definition storage process will be described below using the flowchart of FIG. 11.

When the queue definition storage process starts, the CPU 11 sets the queue name, queue size, and priority stored in the RAM 13 in first to third parameters of a queue definition record (THREAD_QUE), respectively. FIG. 16 shows the format of the queue definition record (THREAD_QUE).

The CPU 11 checks the queue save flag QPF. If the queue save flag QPF is "1", the CPU 11 sets data "QueSaveFile" in a fourth parameter of the queue definition record (THREAD_QUE). Data "QueSaveFile" indicates that the save flag is saved.

If the queue save flag QPF is "0", the CPU 11 omits the fourth parameter of the queue definition record (THREAD_QUE). In this way, since the queue definition record (THREAD_QUE) is settled, the CPU 11 reflects the queue definition record (THREAD_QUE) in the definition file 4. After that, the CPU 11 advances to the process of ST97.

FIG. 17 shows an example of the definition file 4. In FIG. 17, the queue definition record (THREAD_QUE) is reflected in (inserted in) a line next to source code "protected override void QUEMAP". The exclusive table definition record (EXCLUSIVE_JOB) is reflected in (inserted in) a line next to source code "protected override void EXCLUSIVEMAP". The thread definition record (ON_JOB) is reflected in (inserted in) a line next to source code "protected override void JOBMAP".

The CPU 11 executes a source file save process in ST10. This process will be described in detail below using the flowchart of FIG. 12.

The CPU 11 checks in ST101 if a method name is input to the method name field 31a in the method area 31. If no method name is input (no method name is stored in the RAM 13), the CPU 11 advances to a process of ST11.

If a method name is input (a method name is stored in the RAM 13), the CPU 11 checks a thread type selected by one of the selectors 32a, 32b, and 32c from the three different thread types in ST102.

If thread type "Singleton" is selected (thread type identification data "SINGLETON" is stored in the RAM 13), the CPU 11 reads out template data "SINGLETON" from the template file 8. The CPU 11 reflects the method name and the like stored in the RAM 13 in the template data "SINGLETON".

If thread type "Residence" is selected (thread type identification data "RESIDENCE" is stored in the RAM 13), the CPU 11 reads out template data "RESIDENCE" from the template file 8. The CPU 11 reflects the method name and the like stored in the RAM 13 in the template data "RESIDENCE".

If thread type "Dynamic" is selected (thread type identification data "DYNAMIC" is stored in the RAM 13), the CPU 11 reads out template data "DYNAMIC" from the template file 8. The CPU 11 reflects the method name and the like stored in the RAM 13 in the template data "DYNAMIC".

The template file 8 stores templates of source codes which are set in correspondence with thread types. FIG. 18 shows an example of the template data "DYNAMIC". A method name is reflected (inserted) on a portion of source code "FUNC_NAME" in FIG. 18.

The CPU 11 generates one source file 3 on the basis of the template data that reflects the method name and the like in ST103. The CPU 11 then saves this source file 3 in the source program. The CPU 11 clears data (thread name, class name, source file name, thread identification data, exclusive table, queue data, various flags, and the like) stored in the RAM 13. After that, the CPU 11 advances to the process of ST11.

The CPU 11 quits the programming support program 7 in ST11.

When the programming support program 7 is launched on the computer system 1, the thread generation dialog box 30 is displayed on the display device 17a. The programmer determines the method name of a new source file 3 to be generated first. The programmer inputs that method name to the method name field 31a in the method area 31. Then, a class name and source file name are automatically generated based on this method name.

The programmer then determines the thread type of the source file 3. The programmer clicks one of the selectors 32a, 32b, and 32c in the thread type area 32, which corresponds to the determined thread type.

If the determined thread type is "Dynamic", the programmer determines whether or not a thread pool is used. If the thread pool is used, the programmer clicks the selector 33b on the thread pool area 33.

If the determined thread type is "Dynamic" or "Residence", the programmer determines whether or not message queuing is used. If message queuing is used, the programmer clicks the queue generation button 34d on the queue area 34. In response to this operation, the queue generation dialog box 40 is displayed on the display device 17a. The programmer inputs a desired queue name, queue size, priority, and presence/absence of the save flag via the queue generation dialog box 40.

If the determined thread type is "Dynamic" or "Residence", the programmer determines whether or not exclusive control is made. If exclusive control is made, the programmer clicks the exclusive table generation button 35d in the exclusive table area 35. In response to this operation, the exclusive table generation dialog box 50 is displayed on the display device 17a. The programmer selects the method name of a thread which is to undergo exclusive control from the method name list field 52, and inputs the exclusive thread add button 55. Then, the method name of the thread which is to undergo exclusive control is added to the method name list field 53.

If the determined thread type is "Dynamic" or "Residence", the programmer determines whether or not the parallel run count is limited. If the parallel run count is limited, the programmer selects the selector 36b in the parallel run count area 36, and then inputs a parallel run count in the parallel run count field 36c.

After that, the programmer inputs the OK button 37 on the thread generation dialog box 30. In response to this operation, the thread definition record (ON_JOB) which includes parameters of the method name, class name, thread type identification data, parallel run count, exclusive table name, queue name, and thread pool management availability data is reflected in the definition file 4.

When exclusive control is to be made, the exclusive table definition record (EXCLUSIVE_JOB) which includes parameters of the exclusive table name and the method names of exclusive threads is reflected in the definition file 4.

When message queuing is used, the queue definition record (THREAD_QUE) which includes parameters of the queue name, queue size, priority, and save flag is reflected in the definition file 4.

Subsequently, template data is read out from the template file 8. If the determined thread type is "Dynamic", template data "DYNAMIC" is read out. If the determined thread type is "Residence", template data "RESIDENCE" is read out. If the determined thread type is "Singleton", template data "SINGLETON" is read out.

After that, the thread name stored in the RAM 13 is reflected in the template data read out from the template file 8, thus generating a source file 3. This source file 3 is saved in the source program 2.

In this manner, the programmer can generate a source file 3 for each thread and one definition file 4 by inputting only minimum required information via the GUI dialog boxes 30, 40, and 50 displayed on the display device 17a. The source program 2 which consists of the source files 3 and definition file 4 is compiled by the predetermined compiler 5, thus generating an object program 6 as a desired object.

Therefore, the programmer can program even when he or she does not understand the meaning and way to use each individual source code. Since no input errors of the source code occurs, even a beginner can easily program without any errors.

Note that this embodiment uses three selectable thread types "Dynamic", "Residence", and "Singleton". However, the number of thread types is not limited to three.

In the above embodiment, the programming support program 7 is installed on the computer system 1 via the storage medium or communication medium. Also, the present invention includes a computer system dedicated to programming, which pre-stores the programming support program 7.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for supporting programming made on a computer system, comprising:
   a template file which stores templates of source code that are set in correspondence with types of threads;
   a definition file which stores definition information of the thread;
   means for displaying, on a display of the computer system, a thread generation screen including a method area on which a method name used as an identification name of a source file which stores the source code of the thread is input and a thread type area on which any one of a plurality of thread types is selected;
   means for, when the method name is input to the method area of the thread generation screen and any one of the thread types is selected on the thread type area of the same screen, acquiring the template corresponding to the selected thread type from the template file;
   means for inserting the method name input to the method area of the thread generation screen into a predetermined source code of the template acquired from the template file and generating a source file identified by the method name; and
   means for inserting a thread definition record in which the method name iniut to the method area of the thread generation screen and the thread type selected in the thread type area of the same screen are set, as thread definition information of the source file identified as the method name, into a line next to a predetermined code of the definition file.

2. An apparatus according to claim 1, including, in the thread generation screen, a thread parallel run count area to select as to whether or not a parallel run count should be limited for a thread of the source file identified as the method name input in the method area and to input the parallel run count in a case where the parallel run count is limited,
   and wherein the apparatus further comprises:
   means for permitting the selection as to whether or not the parallel run count should be limited in accordance with the thread type selected in the thread type area of the thread generation screen; and
   means for, when the limitation of the parallel run count in the thread parallel run count area of the thread generation screen is selected, setting the parallel run count input in the thread parallel run count area to the thread definition record in which the method name input in the method area of the same screen and the thread type selected in the thread type area of the same screen are set.

3. An apparatus according to claim 1, including, in the thread generation screen, a queue area to select as to whether or not message queuing should be used for a thread of the source file identified as the method name input in the method area,
   and wherein the apparatus further comprises:
   means for permitting the selection as to whether or not the message queuing should be used in accordance with the thread type selected in the thread type area of the thread generation screen;
   means for, when the use of the message queuing in the queue area of the thread generation screen is selected, displaying an input screen of information about the message queuing on the display of the computer system; and
   means for setting the information about the message queuing input via the input screen of the information about the message queuing to the thread definition record in which the method name input in the method area of the same screen and the thread type selected in the thread type area of the same screen are set.

4. An apparatus according to claim 1, including, in the thread generation screen, an exclusive table area to select as to whether or not exclusive control should be executed for a thread of the source file identified as the method name input in the method area,
   and wherein the apparatus further comprises:
   means for permitting the selection as to whether or not the exclusive control should be executed in accordance with the thread type selected in the thread type area of the thread generation screen;

means for, when the execution of the exclusive control in the exclusive table area of the thread generation screen is selected, displaying an input screen of information about other threads subiected to the exclusive control on the display of the computer system; and means for setting the information about the other threads subiected to the exclusive control input via the input screen of the information about the other threads subiected to the exclusive control to the thread definition record in which the method name input in the method area of the same screen and the thread type selected in the thread type area of the same screen are set.

5. A method of supporting programming made on a computer system, comprising:

providing a template file which stores templates of source code that are set in correspondence with types of threads, and a definition file which stores definition information of the thread;

displaying, on a display of the computer system, a thread generation screen including a method area on which a method name used as an identification name of a source file which stores source code of the thread is input and a thread type area on which any one of a plurality of thread types is selected;

acquiring, when the method name is input to the method area of the thread generation screen and any one of the thread types is selected on the thread type area of the same screen, the template corresponding to the selected thread type from the template file;

generating a source identified as the method name by inserting a method name input to the method area of the thread generation screen into a predetermined source code of the template aeguired from the template file; and inserting a thread definition record in which the method name inrut to the method area of the thread generation screen and the thread type selected in the thread type area of the same screen are set, as thread definition information of the source file identified as the method name, into a line next to a predetermined code of the definition file.

6. A method according to claim 5, including, in the thread generation screen, a thread parallel run count area to select as to whether or not a parallel run count should be limited for a thread of the source file identified as the method name input in the method area and to input the parallel run count in a case where the parallel run count is limited, the method further comprising:

permitting the selection as to whether or not the parallel run count should be limited in accordance with the thread type selected in the thread type area of the thread generation screen; and when the limitation of the parallel run count in the thread parallel run count area of the thread generation screen is selected, setting the parallel run count input in the thread parallel run count area to the thread definition record in which the method name input in the method area of the same screen and the thread type selected in the thread type area of the same screen are set.

7. A method according to claim 5, wherein message including, in the thread generation screen, a gueue area to select as to whether or not message queuing should be used for a thread of the source file identified as the method name input in the method area, the method further comprising:

permitting the selection as to whether or not the message queuing should be used in accordance with the thread type selected in the thread type area of the thread generation screen;

when the use of the message queuing in the aueue area of the thread generation screen is selected, displaying an input screen of information about the message queuing on the display of the computer system; and setting the information about the message queuing input via the input screen of the information about the message queuing to the thread definition record in which the method name input in the method area of the same screen and the thread type selected in the thread type area of the same screen are set.

8. A method according to claim 5, including, in the thread generation screen, an exclusive table area to select as to whether or not exclusive control should be executed for a thread of the source file identified as the method name input in the method area, the method further comprising:

permitting the selection as to whether or not the exclusive control should be executed in accordance with the thread type selected in the thread type area of the thread generation screen;

when the execution of the exclusive control in the exclusive table area of the thread generation screen is selected, displaying an input screen of information about other threads subiected to the exclusive control on the display of the computer system; and setting the information about the other threads subiected to the exclusive control input via the input screen of the information about the other threads subiected to the exclusive control to the thread definition record in which the method name input in the method area of the same screen and the thread type selected in the thread type area of the same screen are set.

9. A computer-readable program for supporting programming made on a computer system, the program being embodied on storage medium orcommunication medium and making the computer system execute process routines of:

displaying, on a display of the computer system, a thread generation screen including a method area on which a method name used as an identification name of a source file which stores source code of a thread is input and a thread type area on which any one of a plurality of thread types is selected;

acquiring, when the method name is input to the method area of the thread generation screen and any one of the thread types is selected on the thread type area of the same, a template corresponding to the thread type;

generating a source file identified as the method name by inserting a method name input to the method area of the thread generation screen into a predetermined source code of the template; and inserting a thread definition record in which the method name input to the method area of the thread generation screen and the thread type selected in the thread type area of the same screen are set, as thread definition information of the source file identifies as the method name, into a line next to a predetermined code of the definition file.

10. A program according to claim 9, including, in the thread generation screen, a thread parallel run count area to select as to whether or not a parallel run count should be limited for a thread of the source file identified as the method name input in the method area and to input the parallel run count in a case where the parallel run count is limited, and further making the computer system execute process routines of:

permitting the selection as to whether or not the parallel run count should be limited in accordance with the thread type selected in the thread type area of the thread generation screen; and when the limitation of the parallel run count in the thread parallel run count area of the thread generation screen is selected, setting the parallel run count input in the thread parallel run count area to the thread definition record in which the method name input in the method area of the same screen and the thread type selected in the thread type area of the same screen are set.

11. A program according to claim 9, including, in the thread generation screen, a gueue area to select as to whether or not message gueuing should be used for a thread of the source file identified as the method name input in the method area, and further making the computer system execute process routines of:

permitting the selection as to whether or not the message gueuing should be used in accordance with the thread type selected in the thread type area of the thread generation screen;

when the use of the message gueuing in the gueue area of the thread generation screen is selected, displaying an input screen of information about the message gueuing on the display of the computer system; and setting the information about the message gueuing input via the input screen of the information about the message gueuing to the thread definition record in which the method name input in the method area of the same screen and the thread type selected in the thread type area of the same screen are set.

12. A program according to claim 9, including, in the thread generation screen, an exclusive table area to select as to whether or not exclusive control should be executed for a thread of the source file identified as the method name input in the method area, and further making the computer system execute process routines of:

permitting the selection as to whether or not the exclusive control should be executed in accordance with the thread type selected in the thread type area of the thread generation screen;

when the execution of the exclusive control in the exclusive table area of the thread generation screen is selected, displaying an input screen of information about other threads subiected to the exclusive control on the display of the computer system; and setting the information about the other threads subiected to the exclusive control input via the input screen of the information about the other threads subiected to the exclusive control to the thread definition record in which the method name input in the method area of the same screen and the thread type selected in the thread type area of the same screen are set.

* * * * *